(12) United States Patent
Dunlap et al.

(10) Patent No.: US 7,871,683 B2
(45) Date of Patent: Jan. 18, 2011

(54) BLOW MOLDED CONTAINER

(75) Inventors: Richard L. Dunlap, Cairo, OH (US);
Edward L. Sanford, Lima, OH (US);
Richard C. Darr, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 11/088,550

(22) Filed: Mar. 24, 2005

(65) Prior Publication Data
US 2005/0181159 A1 Aug. 18, 2005

Related U.S. Application Data

(62) Division of application No. 10/304,921, filed on Nov. 26, 2002, now Pat. No. 7,000,512.

(51) Int. Cl.
*B65D 90/00* (2006.01)
*B32B 1/00* (2006.01)

(52) U.S. Cl. .................. 428/35.7; 428/34.1; 428/36.92; 220/675

(58) Field of Classification Search ................ 428/34.1, 428/35.7, 36.6, 36.92, 36.7; 220/669, 675
See application file for complete search history.

(56) References Cited

U.S. PATENT DOCUMENTS

| 1,055,970 | A | 3/1913 | Erickson |
| 2,752,970 | A | 7/1956 | Tupper |
| 3,091,145 | A | 5/1963 | Manganelli |
| 3,520,010 | A | 7/1970 | Dockery |
| 3,608,406 | A | 9/1971 | Paysinger et al. |
| 3,823,626 | A | 7/1974 | Bakewell |
| 3,888,146 | A | 6/1975 | Tomenceak |
| 4,305,904 | A | 12/1981 | Black |
| 4,368,827 | A | 1/1983 | Thompson |
| 4,782,728 | A | 11/1988 | Thatcher |
| 4,820,795 | A * | 4/1989 | Hirata et al. ................. 528/272 |
| 5,160,340 | A | 11/1992 | Gary et al. |
| 5,167,968 | A | 12/1992 | Dunlap et al. |
| 6,113,228 | A * | 9/2000 | Pawlowski et al. ............. 347/81 |
| 6,264,050 | B1 * | 7/2001 | Darr et al. ...................... 215/40 |
| 6,367,360 | B1 | 4/2002 | Dunlap et al. |
| 6,814,923 | B2 | 11/2004 | Bromley et al. |

FOREIGN PATENT DOCUMENTS

| DE | 2 161 246 A1 | 6/1973 |
| EP | 0 845 440 A1 | 6/1998 |

OTHER PUBLICATIONS

European Patent Office Supplementary European Search Report dated Sep. 22, 2010, Application No. 03786720.7 0 2302, Applicant Plastipak Packaging, Inc., 5 pages

* cited by examiner

*Primary Examiner*—David R Sample
*Assistant Examiner*—Walter B Aughenbaugh
(74) *Attorney, Agent, or Firm*—Brooks Kushman P.C.

(57) ABSTRACT

A blow molded container (10) having a trimmed nonround opening (12) is blow molded from a preform (36) and then positioned by a positioner (50) of a nonround trimmer (16) that includes a rotary driven arm assembly (56) having a knife holder (60). A guide (66) guides the knife holder (60) in a nonround path to perform the trimming.

1 Claim, 3 Drawing Sheets

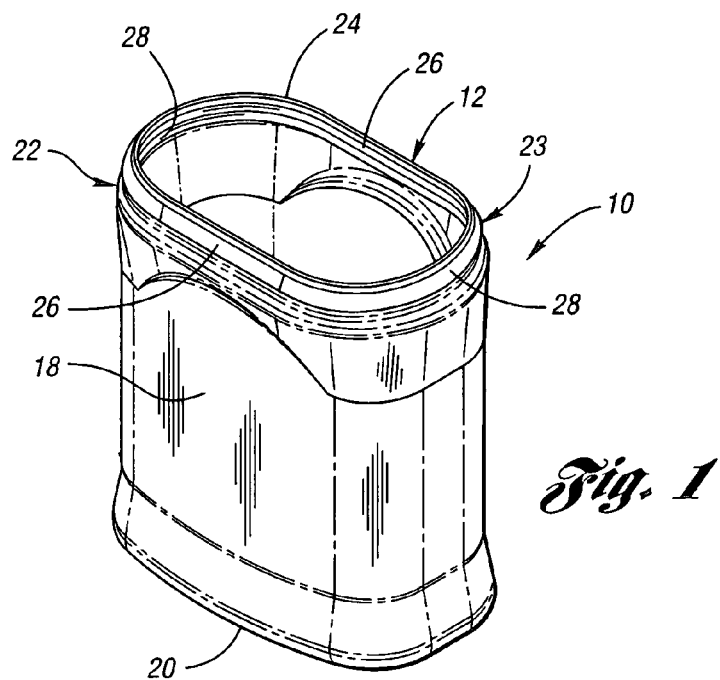
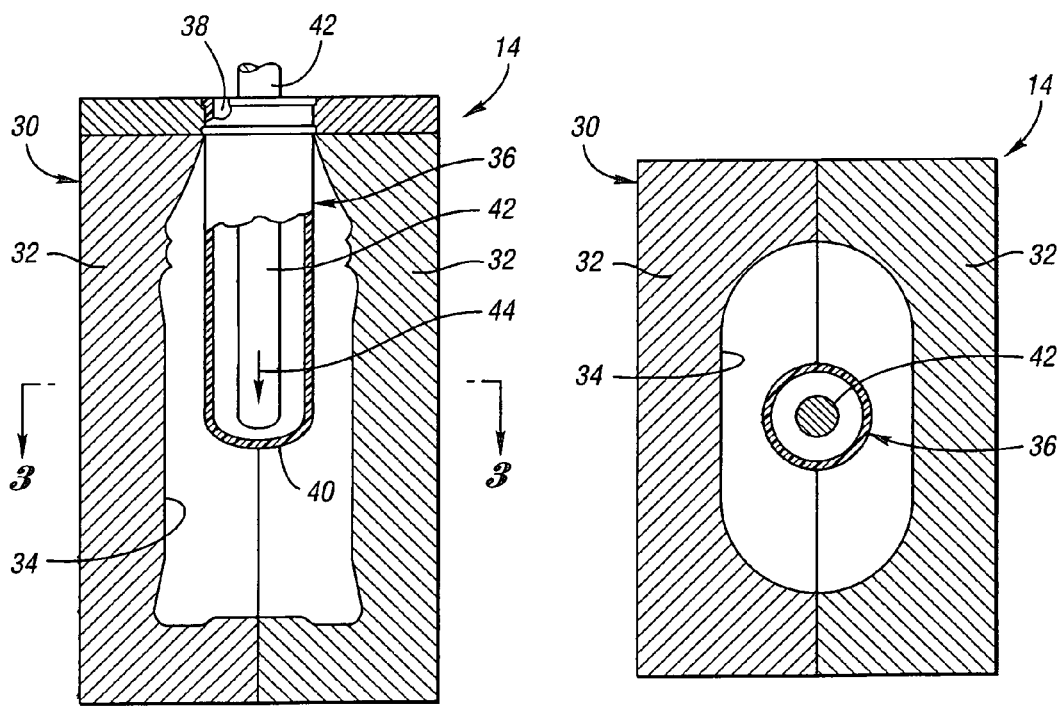

BLOW MOLDED CONTAINER

CROSS-REFERENCE TO RELATED APPLICATIONS

This application is a divisional of application Ser. No. 10/304,921 filed on Nov. 26, 2002 by Richard L. Dunlap, Edward L. Sanford and Richard C. Darr under the title Blow Molding Trimming, now U.S. Pat. No. 7,000,512.

BACKGROUND OF THE INVENTION

1. Field of the Invention

This invention relates to a blow molded container having a trimmed nonround opening.

2. Background Art

In certain blow molding applications, it is desirable to provide post blow molding trimming of the container to remove a scrap piece. Most often, this has been done on extruded blow molded containers to remove blow heads and provide round dispensing openings that usually have a thread or other retainer for securing a closure cap. Such trimmers are disclosed by U.S. Pat. No. 5,167,968 Dunlap et al. and U.S. Pat. No. 6,367,360 Dunlap et al., both of which are assigned to the assignee of the present application.

SUMMARY OF THE INVENTION

An object of the present invention is to provide an improved blow molded container.

In carrying out the above object, the improved blow molded container of the invention is of the type made from an injection molded preform having an open end adjacent which the preform is held during blow molding thereof to include a nonround portion, and the container includes a nonround opening having a trimmed edge at the nonround portion of the container.

The blow molded container of the invention is biaxially oriented and is made of polyethylene terephthalate which, although difficult to trim, can be trimmed with the nonround shape by the trimmer and trimming method of the invention utilized to perform the method for making the blow molded container.

The blow molded container of the invention includes a biaxially oriented body portion of polyethylene terephthalate having a lower closed end and an upper open end. The biaxially oriented body portion has flat sides and rounded ends with the flat sides and rounded ends collectively providing a horizontally elongated shape. The upper end of the body portion is biaxially oriented and has a trimmed edge defining an opening with straight sides and rounded ends, and the straight sides and rounded ends of the opening collectively providing a horizontally elongated shape that facilitates access to any contents in the container.

The objects, features and advantages of the present invention are readily apparent from the following detailed description of the preferred embodiments when taken in connection with the accompanying drawings.

BRIEF DESCRIPTION OF THE DRAWINGS

FIG. 1 is a perspective view of a blow molded container constructed in accordance with the present invention with a trimmed nonround opening.

FIG. 2 is a sectional view taken through a mold in which an injection molded preform is blow molded to provide a container which is subsequently trimmed in accordance with the invention.

FIG. 3 is a sectional view through the mold and preform taken along the direction of line 3-3 in FIG. 2.

DETAILED DESCRIPTION OF THE PREFERRED EMBODIMENTS

Figure 4:
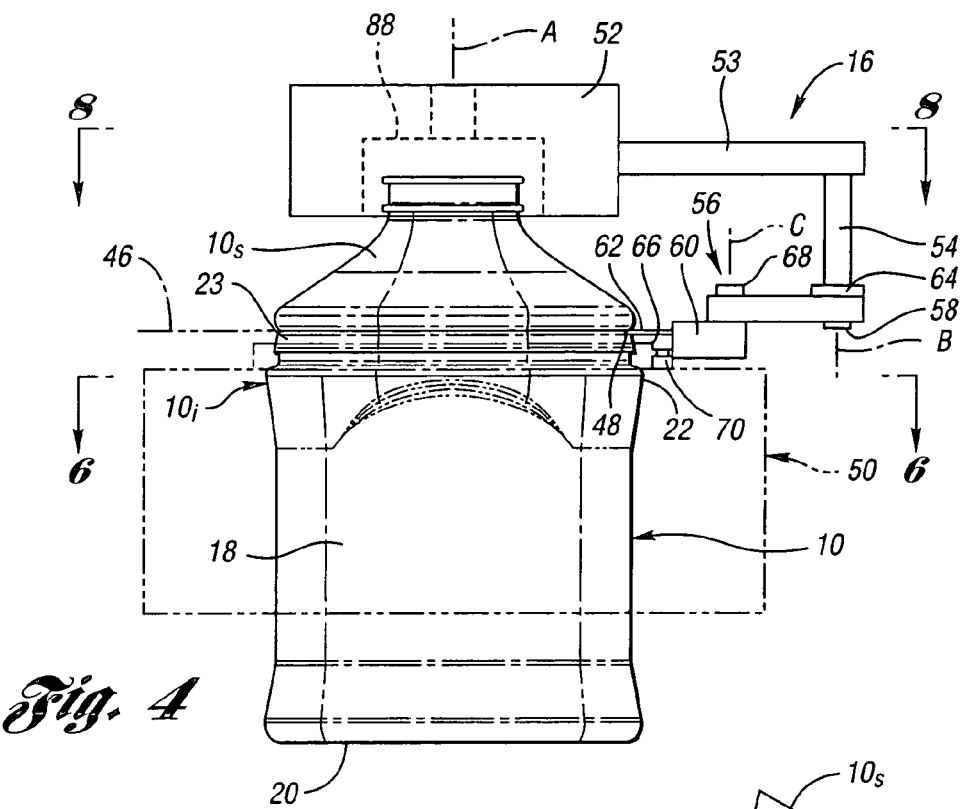
FIG. 4 is an elevational view of a trimmer for performing nonround trimming of the blow molded container in accordance with the invention.
Figure 5:
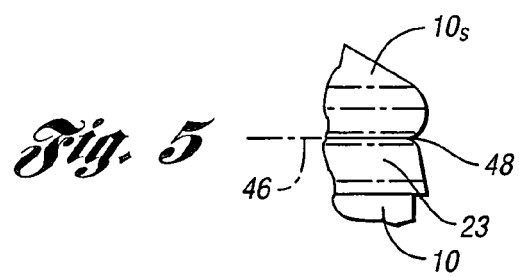
FIG. 5 is an enlarged partial view of FIG. 4 for illustrating a cutting groove at which the nonround trimming is performed.

With reference to FIG. 1 of the drawings, a blow molded container constructed in accordance with the invention is generally indicated by 10 and has a trimmed nonround opening 12 as is hereinafter more fully described.

This container 10 is made by blow molding apparatus 14 illustrated in FIGS. 2 and 3 and by a trimmer 16 that is illustrated in FIGS. 4-9 and performs a trimming method of the invention. The construction of the blow molded container 10, the method for making the blow molded container, the trimmer 16 and the trimming method of the invention will all be described in an integrated manner in order to facilitate an understanding of all aspects of the invention.

With continuing reference to FIG. 1, the container 10 is blow molded with a nonround shape as illustrated and includes a blow molded body portion 18, a lower closed end 20 and an upper open end 22 having a blow molded nonround portion 23 which defines the nonround opening 12 previously mentioned. This nonround opening 12 has a trimmed edge 24 that is provided by the trimmer and trimming method during the blow molded container making operation more fully hereinafter described. As specifically illustrated, the nonround opening 12 has straight sides 26 and semicircular ends 28. However, it should be appreciated that other nonround shapes that are not circular can also be provided in accordance with the invention. Also, the container 10 is made from polyethylene terephthalate which is more difficult to trim than other plastics but can be done in accordance with the invention. The trimming method however is also applicable to other plastics even though it has particular utility when utilized with blow molded polyethylene terephthalate containers.

With reference to FIGS. 2 and 3, the blow molding apparatus 14 includes a mold 30 having mold portions 32 that are movable toward each other to define a blow molding cavity 34 and to also enclose an injection molded preform 36 that is heated either from residual heat of the injection molding of the preform or by a post injection molding heating step. The injection molded preform 36 has an upper open end 38 adjacent which the preform is held during the blow molding by the closed mold 30 and extends downwardly within the mold cavity 34 less than the entire height of the cavity to its lower closed end 40. Upon insertion into the mold, a stretch rod 42 is inserted downwardly to the lower closed end of the preform and is movable as shown by arrow 44 as the blow molding is performed to axially stretch the preform and thereby provide biaxial orientation of the blow molded container and its body portion. However, it should also be appreciated that the invention has applicability to nonstretched preforms where the additional strength added by biaxial orientation is not required.

After the blow molding within the mold 30 illustrated in FIGS. 2 and 3, the initial blow molded container $10_i$ has the shape illustrated in FIG. 4 including the lower container 10 that eventually results as was previously described in FIG. 1 as well as having the upper scrap piece $10_s$ that is trimmed by the trimmer 16 as is hereinafter more fully described. This trimming takes place at the container nonround portion 23 along a trimming plane 46 that extends perpendicular to a rotary axis A of the trimmer 16. More specifically, this trimming is performed within a trimming groove 48 shown in FIG. 5 such that the trimming plane 46 and trimming groove 48 are located between the lower blow molded container 10 and the upper scrap piece $10_s$.

With continuing reference to FIG. 4, the trimmer 16 includes a positioner 50 for holding the container $10_i$ so that its nonround portion 23 is accessible for the trimming to be performed. A rotary actuator 52 of the trimmer rotates about the rotary axis A that extends perpendicular to the trimming plane 46 of the container as it is held by the positioner 50. This rotary actuator 52 includes a portion 53 that extends in an outward direction radially from the rotary axis A and has a downwardly projecting support 54 that extends along an arm axis B spaced outwardly from the rotary axis A and extending in a parallel relationship. A knife holder arm assembly 56 is pivotally supported by a pivotal connection 58 on the rotary actuator support 54 about the arm axis B. This arm assembly 56 includes a knife holder 60 for supporting a knife 62 for trimming the container. A biaser provided by a spring 64 biases the arm assembly 56 so the knife holder 60 is biased toward the rotary axis A during rotation of the rotary axis. A guide 66 of the trimmer is engaged by the knife holder 60 under the impetus of the spring biaser 64 during rotation of the rotary actuator so that the knife 62 held thereby moves in a nonround path as illustrated by the positions of the knife holder arm assembly $56_a$, $56_b$, $56_c$, and $56_d$ in FIG. 8 as the knife 62 cuts through the nonround portion 23 of the container and thereby trims the scrap piece from the container. During such movement, the arm assembly pivots about the axis B as necessary to properly position the knife holder as it is guided by the guide 66 with the spring biaser 64 ensuring the proper positioning. It has been found that good results are achieved when the angle of the knife cutting edge defines an included angle of less than 45° with the container portion being cut so as to ensure that there is a slicing trimming that provides a smooth trim edge to the container.

Figure 8:
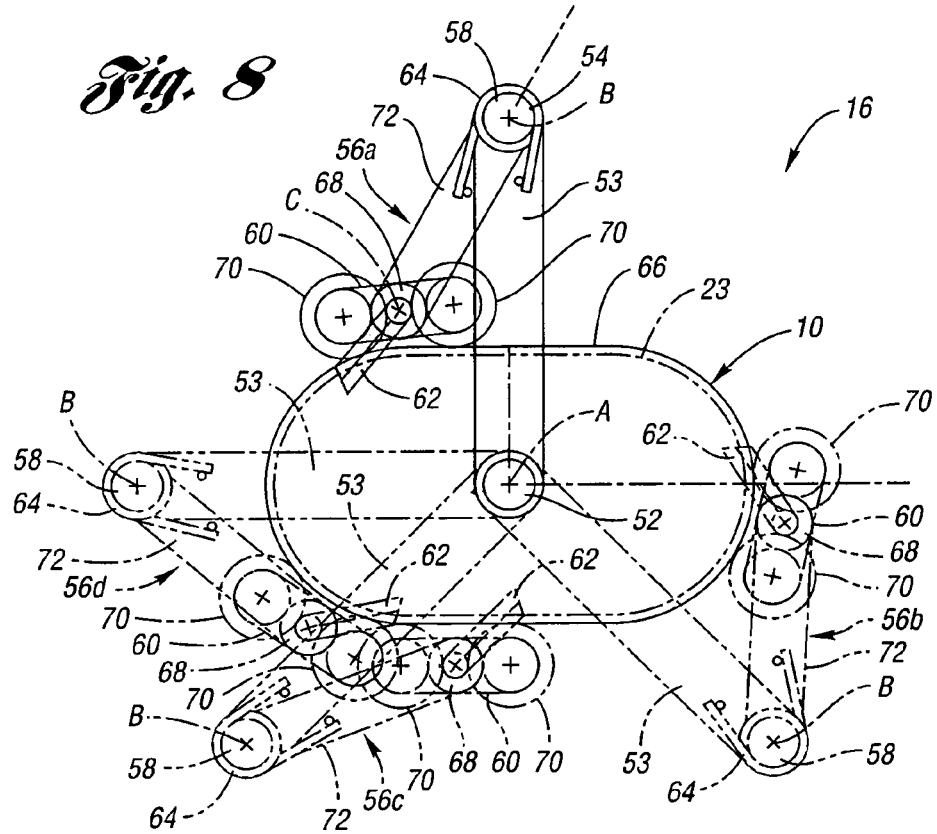
FIG. 8 is a somewhat schematic top plan view taken along the direction of line 8-8 in FIG. 4 and illustrates one embodiment of a knife holder arm assembly of the trimmer shown in different positions as it moves around the container to perform the trimming.

As shown in both FIGS. 4 and 8, the trimmer includes a pivotal connection 68 that pivotally supports the knife holder 60 on the arm assembly 56 about an axis C so that the knife holder can pivotally rotate as necessary with respect to the arm assembly. Furthermore, the knife holder includes at least one roller 70 and actually a pair of the rollers 70 that roll along the guide 66 during the cutting that performs the trimming. The spring biaser 64 of the arm assembly 56 biases the arm assembly inwardly so that each roller 70 engages the guide 66 and thereby properly angularly positions the knife 62 with respect to the container nonround portion 23 being trimmed as previously described.

With continuing reference to FIG. 8, the embodiment of the arm assembly 56 illustrated includes an arm 72 having one end supported by the pivotal connection 58 on the rotary actuator portion 53 for pivotal movement about the arm axis D with the biaser spring 64 providing a counterclockwise bias thereabout that biases the knife 62 held by the arm assembly inwardly toward the rotary axis A. The other end of the arm 72 supports the pivotal connection 68 by which the knife holder 60 is supported on the arm assembly with its roller 70 in engagement with the guide 66.

Figure 9:
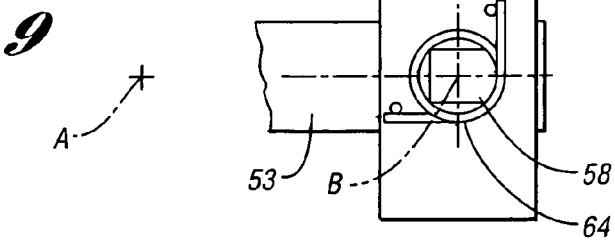
FIG. 9 is a view similar to FIG. 8 showing another embodiment of the arm assembly of the trimmer.

With reference to FIG. 9, another embodiment of the trimmer arm assembly 56' includes a first arm 74 having one end supported by the pivotal connection 58 on the portion 53 of the rotary actuator 58 for pivotal movement about the axis B and a first spring 64 provides biasing thereof in a counterclockwise direction about axis B. A second arm 76 has one end supported by a pivotal connection 78 about an axis D on the other end of the first arm 74 and a second spring 80 provides counterclockwise biasing of the second arm about axis D inwardly toward the central rotary axis A. The other end of the second arm 76 supports the pivotal connection 68 on which the knife holder 60 is supported with the knife 62 supported and guided by the rollers 70 in association with the guide previously described. Provision of the pair of arms 74 and 76 permits the trimming to accommodate nonround shapes of greater elongation with a reduced outward radial space requirement as compared to that required with a single arm as with the embodiment of FIG. 8. More specifically, pivoting of both of the arms 74 and 76 about their associated pivotal connections 58 and 78 with the biaser springs 64 and 80 allows the trimming of nonround shapes with a lesser requirement for radial spacing from the rotary axis A.

Figure 6:
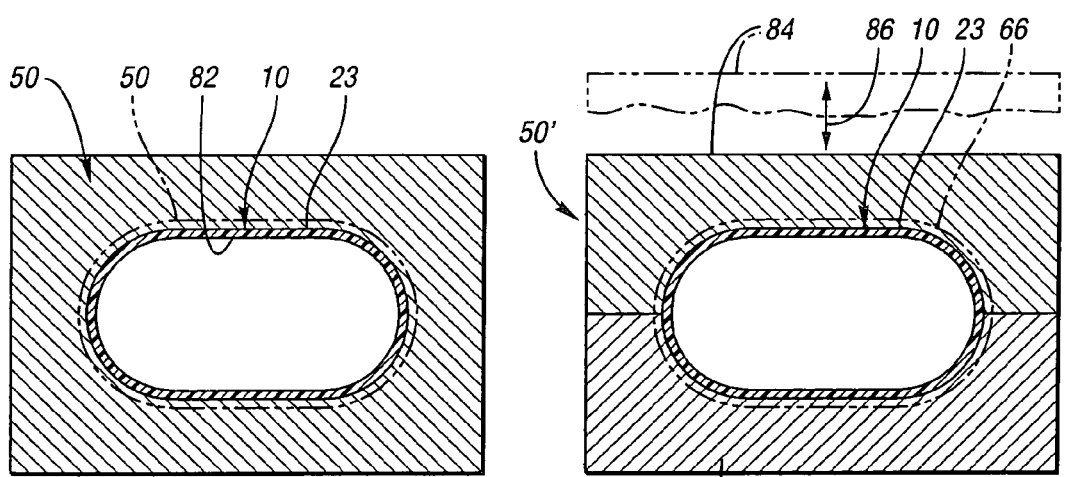
FIG. 6 is a sectional view taken along the direction of line 6-6 in FIG. 4 to illustrate one embodiment of a positioner having a nonround opening in which a nonround portion of the container is positioned during the trimming.

With combined reference to FIGS. 4 and 6, the positioner 50 illustrated has a nonround opening 82 through which the container is inserted to position the container adjacent its nonround portion 23 at which the trimming takes place as previously described. Such positioning of the container together with the trimming performed by cutting through the cutting groove previously described in connection with FIG. 5 with the knife angularly oriented provides a smooth trimmed edge to the resultant container.

Figure 7:
FIG. 7 is a sectional view similar to FIG. 6 of another embodiment wherein the positioner includes a pair of clamp members that position the nonround portion of the container during the trimming.

With reference to FIG. 7, another embodiment of the positioner 50' includes a pair of clamp members 84 that are movable as shown by arrows 86 to clamp and unclamp the nonround container portion 23 in preparation for the trimming.

Each of the embodiments of the positioners 50 and 50' respectively illustrated in FIGS. 6 and 7 has the guide 66 located on the positioner so as to provide the proper path of movement of the knife holder and angular orientation of the knife blade during the trimming operation.

As shown in FIG. 4, the trimmer also includes a scrap holder 88 for holding the scrap piece $10_s$ during the trimming, which allows the scrap piece to be subsequently conveyed to a scrap line or otherwise removed without randomly flying off onto the factory floor. This scrap holder 88 may be embodied by different constructions including a pneumatically inflatable ring that is inserted into the open end of the container, pneumatically actuated fingers that hold the scrap piece to be trimmed either on the inside or outside of its open end, or mechanically actuated fingers that hold the scrap piece to be trimmed likewise either on the inside or outside of its open end.

While the preferred embodiments and ways of practicing the invention have been described in detail, those familiar with the art to which this invention relates will recognize other ways of practicing the invention as defined by the following claims.

What is claimed is:

1. A blow molded container comprising:

a biaxially oriented body portion of polyethylene terephthalate having a lower closed end and an upper open end;

the biaxially oriented body portion having flat sides and rounded ends with the flat sides and rounded ends collectively providing a horizontally elongated shape; and the upper end of the body portion being biaxially oriented and having a trimmed edge defining an opening with straight sides and rounded ends, with the straight sides and rounded ends of the opening collectively providing a horizontally elongated shape that facilitates access to any contents in the container.

* * * * *